United States Patent [19]

Pettit, Jr. et al.

[11] Patent Number: 4,727,111

[45] Date of Patent: Feb. 23, 1988

[54] POWDER COATING COMPOSITIONS BASED ON MIXTURES OF ACID GROUP-CONTAINING MATERIALS AND BETA-HYDROXYALKYLAMIDES

[75] Inventors: Paul H. Pettit, Jr., Allison Park; Marvin L. Kaufman, Pittsburgh, both of Pa.

[73] Assignee: PPG Industries, Inc., Pittsburgh, Pa.

[21] Appl. No.: 912,463

[22] Filed: Sep. 29, 1986

[51] Int. Cl.[4] ............ C08F 8/30; C08F 20/06
[52] U.S. Cl. .................. 525/190; 525/329.7; 525/329.9; 525/374; 525/386; 525/330.5; 525/934
[58] Field of Search ........... 525/327.6, 190, 329.7, 525/329.9, 374, 386, 934

[56] References Cited

U.S. PATENT DOCUMENTS

| | | | |
|---|---|---|---|
| 3,752,870 | 8/1973 | Labana | 260/836 |
| 3,845,016 | 10/1974 | Labana et al. | 260/42.18 |
| 3,939,127 | 2/1978 | Labana et al. | 525/190 |
| 4,069,274 | 1/1978 | Shibata et al. | 525/190 |
| 4,076,917 | 2/1978 | Swift et al. | 526/49 |
| 4,101,606 | 7/1978 | Cenci et al. | 260/857 UN |
| 4,115,637 | 9/1978 | Cenci et al. | 526/56 |
| 4,138,541 | 2/1979 | Cenci et al. | 526/303 |
| 4,346,144 | 8/1982 | Craven | 428/335 |

OTHER PUBLICATIONS

Journal of Coatings Technology, vol. 50, No. 643, Aug. 1978, pp. 49–55.

*Primary Examiner*—John C. Bleutge
*Assistant Examiner*—David W. Woodward
*Attorney, Agent, or Firm*—William J. Uhl

[57] ABSTRACT

A thermosetting powder coating composition which has good handling properties and which has a good blend of physical properties such as appearance, flexibility, hardness, solvent resistance, corrosion resistance and exterior durability is disclosed. The composition comprises a co-reactable particulate mixture of an acid group-containing acrylic polymer; an aliphatic dicarboxylic acid containing from 4 to 20 carbon atoms per molecule and/or a polymeric polyanhydride and a beta-hydroxyalkylamide crosslinking agent.

11 Claims, No Drawings

POWDER COATING COMPOSITIONS BASED ON MIXTURES OF ACID GROUP-CONTAINING MATERIALS AND BETA-HYDROXYALKYLAMIDES

BACKGROUND OF THE INVENTION

1. Field of the Invention

The present invention relates to thermosetting powder coating compositions and more particularly to powder coating compositions which have good exterior durability.

2. Brief Description of the Prior Art

Powder coating compositions for use in painting are extremely desirable. Such coating compositions greatly reduce and can even eliminate the organic solvents used in liquid paints. When the powder coating composition is cured by heating, little if any volatile material is given off to the surrounding environment. This is a significant advantage over liquid paints in which organic solvent is volatilized into the surrounding atmosphere when the paint is cured by heating.

For exterior durability, the powder coating composition is usually formulated with an acrylic polymer. The curing mechanism is also important and one of the better ones for attaining exterior durability is based on an acid group-containing acrylic polymer and triglycidyl isocyanurate (TGIC) curing agent. Although powder coating compositions using these materials give coatings with good exterior durability, they are expensive to formulate because of the TGIC and often have poor stability and give coatings which are often deficient in other physical properties.

SUMMARY OF THE INVENTION

In accordance with the present invention, a thermosetting powder coating composition is provided. The composition comprises:

(A) an acid group-containing acrylic polymer having a Tg in the range of 35°–100° C.,
(B) a second carboxy-containing material selected from the class consisting of an aliphatic dicarboxylic acid containing from 4 to 20 carbon atoms per molecule and a polymeric polyanhydride including mixtures thereof, and
(C) a beta-hydroxyalkylamide curing agent.

The powder coating compositions have good stability, i.e., do not clump when exposed to heat, and give coatings with good exterior durability and a good blend of other physical properties such as good appearance, flexibility, hardness, solvent resistance and corrosion resistance.

DETAILED DESCRIPTION

The powder coating compositions of the present invention comprise an intimate mixture of several materials. There are three essential ingredients in the powder coating composition, namely, the carboxylic acid group-containing acrylic polymer, a second carboxy material selected from the aliphatic polycarboxylic acid, polymeric polyanhydride including mixtures thereof and a beta-hydroxyalkylamide curing agent.

The acid group-containing acrylic polymer preferably has a number average molecular weight of about 1500 to 15,000, preferably 1800 to 6000, and a glass transition temperature (Tg) in the range of 35° to 100° C., preferably about 45° to 70° C. The acrylic polymer provides for hardness, gloss, durability and solvent resistance in the resultant coating.

The molecular weights of the acrylic polymer are determined by gel permeation chromatography (GPC) using a polystyrene standard. Therefore, it is not the actual molecular weight which is measured but an indication of the molecular weight as compared to polystyrene. The values which are obtained are commonly referred to as polystyrene numbers; however, for the purposes of this application, they are referred to as molecular weights. If the number average molecular weight is below 1500, the solvent resistance and mechanical strength of the resultant coating may be poor. If the molecular weight is higher than 15,000, the melt flow of the polymer is low and the coating may have poor appearance.

The Tg of the polymer is a measure of the hardness and melt flow of the polymer. The higher the Tg, the less the melt flow and the harder the coating. Tg is described in *PRINCIPLES OF POLYMER CHEMISTRY* (1953), Cornell University Press. The Tg can be actually measured or it can be calculated as described by Fox in *Bull. Amer. Physics Soc.*, 1, 3, page 123 (1956). Tg as used herein refers to actually measured values. For measurement of the Tg of the polymer, differential scanning calorimetry can be used (rate of heating 10° C. per minute, Tg taken at the first inflection point).

If the glass transition temperature is below 35° C., the polymer tends to be sticky and difficult to handle. If the glass transition temperature is greater than 100° C., the melt flow of the polymer is low and the coating may have poor appearance.

The carboxylic acid group-containing acrylic polymer can be formed by reacting a polymerizable alpha, beta-ethylenically unsaturated carboxylic acid with one or more other polymerizable alpha, beta-ethylenically unsaturated monomers, particularly vinyl aromatic monomers and esters of alpha, beta-ethylenically unsaturated carboxylic acids.

Examples of the carboxylic acid group-containing monomers which can be used are acrylic acid and methacrylic acid, which are preferred, as well as crotonic acid, itaconic acid, fumaric acid, maleic acid, citraconic acid, and the like, as well as monoalkylesters of unsaturated dicarboxylic acids. The acid group-containing monomer is preferably present in the polymer in amounts of about 6 to 25 percent by weight, more preferably from 8 to 18 percent by weight based on total weight of the monomers. Amounts less than 6 percent by weight may result in poor solvent resistance and poor mechanical strength of the coating.

Examples of vinyl aromatic compounds are monofunctional vinyl aromatic compounds such as styrene, which is preferred, and alkyl-substituted styrenes such as alpha-methylstyrene and chloro-substituted styrene such as chlorostyrene. The vinyl aromatic monomer is preferably present in the composition in amounts of about 5 to 45, more preferably from 10 to 40 percent by weight based on the total weight of the monomers. Amounts less than 5 percent by weight may result in poor corrosion resistance, whereas amounts greater than 45 percent by weight may result in poor exterior durability.

Examples of esters of alpha, beta-ethylenically unsaturated acids are esters of acrylic and methacrylic acid and include methyl methacrylate, ethyl acrylate, butyl acrylate, 2-ethylhexyl acrylate, dodecyl acrylate, methyl methacrylate, ethyl methacrylate, N-butyl methacrylate and 2-ethylhexyl methacrylate. Preferably, these esters are present in amounts of about 5 to 70, more preferably from about 10 to 50 percent by weight based on total weight of the monomers. Preferably, the esters of the alpha, beta-ethylenically unsaturated acids are a mixture of $C_1$ to $C_2$ alkyl esters and $C_4$ to $C_{20}$ alkyl esters, such as a mixture of methyl methacrylate and butyl acrylate. Preferably, the $C_4$ to $C_{20}$ alkyl ester is present in amounts of 5 to 40, more preferably 10 to 20 percent by weight based on total weight of monomers. Amounts less than 5 percent by weight may result in coatings with poor flexibility and impact resistance, whereas amounts greater than 40 percent by weight may cause stability problems in the coating composition. The $C_1$ to $C_2$ alkyl ester is preferably present in amounts of 15 to 80, more preferably 30 to 60 percent by weight based on total weight of monomers. Amounts less than 15 percent by weight may result in coatings with poor hardness and durability, whereas amounts greater than 80 percent by weight may result in coatings with poor flexibility.

In addition to the vinyl aromatic compounds and esters of acrylic and methacrylic acid, other ethylenically unsaturated copolymerizable monomers may be used. Examples include nitriles such as acrylonitrile, vinyl and vinylidene halides such as vinyl chloride and vinylidene fluoride and vinyl esters such as vinyl acetate. These additional monomers are present in amounts of about 0 to 40, preferably from 0 to 30 percent by weight based on total weight of monomers.

In preparing the acid group-containing acrylic polymer, the various monomers are mixed together and are reacted by conventional free radical initiated polymerization processes. Among the free radical initiators which may be used are benzoyl peroxide, tertiarybutyl hydroperoxide, ditertiarybutyl peroxide, azobis(2-methylpropionitrile) and so forth. Chain transfer agents such as mercaptopropionic acid can also be used. The polymerization is preferably carried out in solution using a solvent in which the monomers are soluble such as toluene or xylene. At the completion of the polymerization, the reaction mixture is devolatilized such as by placing it under vacuum to remove the organic solvent and recovering the polymer as a solid material. Alternately, the polymer can be precipitated and subsequently dried. Usually the devolatilized polymer will contain less than 1 percent by weight of materials that volatilize at the temperatures used for curing the coatings.

The acid group-containing acrylic polymer can also be prepared by emulsion polymerization, suspension polymerization, bulk polymerization or suitable combinations thereof. These techniques are well known in the art. Besides free radical initiated polymerization, other means of polymerization such as group transfer and anionic polymerization can be used to prepare the acrylic polymer.

The acid group-containing acrylic polymer is preferably used in amounts of about 35 to 85, more preferably 40 to 75 percent by weight based on weight of resin solids. Amounts less than 35 percent by weight are not preferred because of tendencies to poor hardness, durability and solvent resistance in the resultant coating. Amounts greater than 85 percent by weight may result in coatings with poor flexibility and impact strength.

Besides the carboxylic acid group-containing polymer, the thermosetting powder coating composition of the invention preferably contains another carboxy group-containing material which is selected from the class consisting of $C_4$ to $C_{20}$ aliphatic dicarboxylic acids and/or a polymeric polyanhydride including mixtures thereof. These materials are desirable because they provide for flexibility and impact resistance in the resultant coating and also assist in the flow providing for smooth, glossy coatings. Among the aliphatic polycarboxylic acids which may be used include dicarboxylic acids, specifically adipic acid, suberic acid, azelaic acid, sebacic acid and dodecanedioic acid. Preferably, the aliphatic dicarboxylic acid contains an even number of carbon atoms and is a solid at room temperature. Dodecanedioic acid is preferred.

The polymeric polyanhydride includes those of the structure:

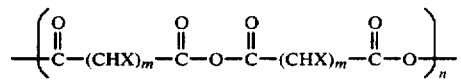

where X is equal to H, $CH_3$, $C_2H_5$ and m equals 4 to 12 and n is of such a value that the molecular weight of the polymeric polyanhydride is in the range of about 400 to 2500, preferably about 600 to 1200 on a number average basis. Molecular weights greater than 2500 are undesirable because of a tendency to cause poor stability in the coating composition. Examples of suitable polymeric polyanhydrides are poly(adipic anhydride), poly(azelaic anhydride), poly(sebacic anhydride), poly(dodecanedioic anhydride) and mixed acid anhydrides.

The polymeric polyanhydride can be prepared by heating the acid precursor from which the anhydride is derived from a simple anhydride such as acetic anhydride and removing the evolved acid (acetic) which is generated under vacuum. Preferably, the acid contains an even number of carbon atoms so that the resultant polymeric polyanhydride will be a solid at room temperature.

The amounts of aliphatic polycarboxylic acid and/or polymeric polyanhydride which are used can vary from about 1 to 25, preferably from about 5 to 20 percent by weight based on weight of resin solids. Amounts greater than 25 percent by weight are undesirable because of a tendency to cause poor stability in the coating composition, whereas amounts less than 1 percent by weight are undesirable because of tendencies toward poor flow and poor flexibility in the coating.

Besides the carboxylic acid group-containing materials described above, other optional polycarboxylic acid group-containing materials can be included in the composition. Examples of these other materials are carboxylic acid group-containing polyesters and carboxylic acid group-containing polyurethanes.

The carboxylic acid group-containing polyester contributes flexibility, impact resistance and corrosion resistance to coatings deposited from the compositions of the present invention. Among the carboxylic acid group-containing polyesters which may be used are those based on condensing aliphatic including cycloaliphatic polyols with aliphatic and/or aromatic polycarboxylic acids and anhydrides. Examples of suitable aliphatic polyols include ethylene glycol, propylene glycol, butylene glycol, 1,6-hexylene glycol, neopentyl glycol, cycloyhexanedimethanol, trimethylolpropane and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

These ingredients are reacted together with an excess of acid and alcohol so as to form a polyester which has free carboxylic acid groups. Preferably, on a resin solids basis, the carboxylic acid group-containing polyester will have an acid number of about 15 to 100 and will be a solid at room temperature. If the polyester is present in the composition, it is present in amounts of 5 to 40 percent by weight, preferably about 15 to 35 percent by weight based on weight of resin solids. Amounts greater than 40 percent by weight are undesirable because of tendencies towards poor solvent resistance and poor exterior durability in the coating.

The carboxylic acid group-containing polyurethane contributes durability to the resultant coating. The polyurethane can be prepared by reacting polyols and polyisocyanates so as to form a polyurethane polyol which is then reacted with polycarboxylic acid or anhydride to introduce free carboxyl groups into the reaction product. Examples of polyols include those mentioned above in connection with the preparation of the polyester. Examples of polyisocyanates are aromatic and aliphatic polyisocyanates with the aliphatic polyisocyanates being preferred because of better exterior durability. Specific examples include 1,6-hexamethylene diisocyanate, isophorone diisocyanate and 4,4'-methylene-bis-(cyclohexyl isocyanate). Examples of suitable polycarboxylic acids are those mentioned above in connection with the preparation of the polyester. Preferably, the carboxylic acid group-containing polyurethane has an acid number on a resin solids basis of about 15 to 100 and will be a solid at room temperature. If the polyurethane is used, it is used in amounts of 5 to 40 percent by weight, preferably about 15 to 35 percent by weight based on weight of resin solids. Amounts greater than 40 percent by weight are undesirable because of poor stability in the coating composition.

The beta-hydroxyalkylamides are the curing agents for the composition. They provide a crosslinked polymer network which is hard, durable, corrosion resistant and solvent resistant. It is believed the hydroxyalkylamides cure the coating through an esterification reaction with the carboxy-containing compounds forming multiple ester crosslinks. The hydroxyl functionality of the hydroxyalkylamide should be on an average basis at least 2 and preferably greater than 2, more preferably greater than 2, up to and including 4 in order to obtain optimum curing response.

The beta-hydroxyalkylamide curing agents can be depicted structurally as follows:

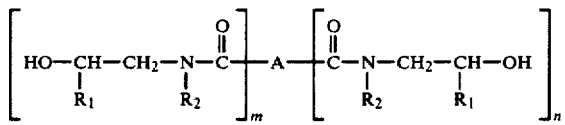

where $R_1$ is H or $C_1$–$C_5$ alkyl;

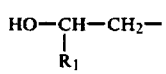

or wherein $R_1$ is as described above; A is a bond, monovalent or polyvalent organic radical derived from a saturated, unsaturated or aromatic hydrocarbon including substituted hydrocarbon radicals containing from 2 to 20 carbon atoms. Preferably, A is an alkylene radical —$(CH_2)_x$— where X is equal to 2 to 12, preferably 4 to 10; m is equal to 1 to 2 and n is equal to 0 to 2 and m+n is at least 2, preferably greater than 2, usually within the range of being greater than 2 and up to and including 4.

The beta-hydroxyalkylamides can be prepared by reacting a lower alkyl ester or mixture of esters of carboxylic acids with a beta-hydroxyalkylamine at a temperature ranging from ambient temperature up to about 200° C., depending on the choice of reactants and the presence or absence of catalyst. Suitable catalysts include sodium and potassium methoxide or butoxide present in amounts of about 0.1 to 1 percent by weight based on weight of alkyl ester.

To bring about effective cure of the composition, the equivalent ratio of beta-hydroxyalkylamide (hydroxy equivalents) to carboxy-containing materials (carboxylic acid equivalents and anhydride equivalents, with each anhydride counting as 2 carboxy groups) is preferably from about 0.6 to 1.6:1, more preferably 0.9 to 1.2:1. Ratios outside the range of 1.6–0.6:1 are undesirable because of poor cure.

In order to give the powder coating composition a suitable color, a pigment can be included in the coating composition typically in amounts of from about 1 to 50 percent by weight based on total weight of the powder coating composition. Pigments which are suitable for powder coating compositions include basic lead silica chromate, titanium dioxide, ultramarine blue, phthalocyanine blue, phthalocyanine green, carbon black, black iron oxide, chromium green oxide, ferrite yellow and quindo red.

The coating composition may also contain certain other additives that are typically incorporated into powder coating compositions. Particularly recommended are degassing agents which allow volatiles to escape from the film during baking and flow control agents which prevent cratering of the finish. Benzoin is a highly preferred degassing agent and when used is present in amounts ranging from 0.5 to 3 percent by weight based on total weight of the composition.

One group of suitable flow control agents are acrylic polymers such as polylauryl acrylate, polybutyl acrylate, poly(2-ethylhexyl) acrylate, poly(ethyl-2-ethylhexyl) acrylate, polylauryl methacrylate and polyisodecenyl methacrylate. The flow control agent may also be a fluorinated polymer such as an ester of polyethylene glycol or polypropylene glycol and fluorinated fatty acids, for example, an ester of polyethylene glycol of a molecular weight of over 2500 and per fluorooctanoic acid. Polymeric siloxanes of molecular weights over 1000 may also be used as a flow control agent, for example, poly(dimethylsiloxane) or poly(methylphenyl)siloxane. The flow control agent when used is present in amounts of about 0.5 to 5 percent by weight based on total weight of the coating composition.

For good exterior durability, the compositions also preferably contain UV absorbing agents and anti-oxidants. Such materials are commercially available from Ciba-Geigy under the trademark TINUVIN and IRGANOX. The UV absorbing agents and anti-oxidants when used are typically present in the compositions individually in amounts of about 1.5 to 6 percent by weight based on weight of resin solids.

The thermosetting powder coating compositions are prepared by melt blending the ingredients of the coating compositions. This can be accomplished by first blending in a planetary mixer and then melt blending in an extruder at a temperature of about 80° to 130° C. The extrudate is then cooled and particulated into a powder. The powder coating composition can then be applied directly to metal such as steel or aluminum, glass, plastic or fiber-reinforced plastic substrates.

Application of the powder can be by electrostatic spraying or by the use of a fluidized bed. Preferred is electrostatic spraying. the powder composition can be applied in one pass or in several passes to provide a film thickness after cure of about 0.5 to 5 mils. Preferably, to provide a high quality finish at reasonable cost, the thickness of the powder cost is about 1.2 to 4 mils, preferably 1.4 to 3 mils.

The substrate to be coated can optionally be preheated prior to application of the powder to promote more uniform powder deposition. Upon application of the powder, the powder-coated substrate is baked typically at 300° to 400° F. (149° to 204° C.) for about 20 to 60 minutes.

The present invention will be more fully understood from the following illustrative examples wherein all quantities, percentages and ratios are on a weight basis unless otherwise indicated.

The following examples (A-H) show the preparation of various carboxylic acid group-containing acrylic polymers, polymeric polyanhydrides, carboxylic acid group-containing polyesters and polyurethanes and hydroxyalkylamide curing agents which are used in preparing thermosetting powder coating compositions.

EXAMPLE A

A carboxylic acid group-containing acrylic polymer was prepared from the following ingredients:

| Ingredient | Parts by Weight (grams) |
| --- | --- |
| Reactor Charge | |
| Xylene | 2400 |
| Initiator Charge | |
| Ditertiarybutyl peroxide | 111.0 |
| Xylene | 189.0 |
| Monomer Charge | |
| Styrene | 832.5 (15%) |
| Methyl methacrylate | 3269.0 (58.9%) |
| Butyl acrylate | 754.8 (13.6%) |
| Methacrylic acid | 693.7 (12.5%) |
| Mercaptopropionic acid | 138.8 |

The reactor charge was heated under a nitrogen atmosphere to reflux. The initiator charge and monomer charge was then added slowly and simultaneously to the reactor charge over a period of about 3 hours while keeping the reaction mixture at reflux. After the feeds of the initiator charge and monomer charge were completed, the reaction mixture was held for 2 hours at reflux. The reaction mixture was then heated under vacuum to remove solvent. The resultant reaction product had a solids content of 99.7 percent (measured at 150° C. for 2 hours), an acid value of 58.8, a number average molecular weight of 2207 and a weight average molecular weight of 7737; the molecular weights being determined by gel permeation chromatography using a polystyrene standard.

EXAMPLE B

An acrylic polymer similar to Example A but containing different percentages by weight styrene and methyl methacrylate was prepared from the following ingredients:

| Ingredient | Parts by Weight (grams) |
| --- | --- |
| Reactor Charge | |
| Xylene | 2000 |
| Initiator Charge | |
| Ditertiarybutyl peroxide | 92.5 |
| Xylene | 157.5 |
| Monomer Charge | |
| Styrene | 1618.8 (35%) |
| Methyl methacrylate | 1798.9 (38.9%) |
| Butyl acrylate | 629.0 (13.6%) |
| Methacrylic acid | 578.3 (12.5%) |
| Mercaptopropionic acid | 115.8 |

The polymer was prepared as generally described above for Example A. The polymer after vacuum stripping had a solids content of 99.8 percent, an acid value of 79.3, a number average molecular weight of 2317 and a weight average molecular weight of 7980.

EXAMPLE C

Poly(dodecanedioic anhydride) was prepared from the following ingredients:

| Ingredient | Parts by Weight (grams) |
| --- | --- |
| Dodecanedioic acid | 3105.0 |
| Acetic anhydride | 918.0 |

The ingredients were charged to a reactor and heated under a nitrogen atmosphere to 125° C. Reaction was continued at this temperature for about 4 hours while vacuum stripping the evolving acetic acid. The temperature was then raised to 150° C. and held at this temperature for about 1 hour. The vacuum source was then removed and the reaction mixture cooled to room temperature to give a white solid reaction product. Solids content was 97.6 measured at 110° C. for 2 hours.

EXAMPLE D

An acid functional polyester was prepared from the following mixture of ingredients:

| Ingredient | Parts by Weight (grams) |
| --- | --- |
| Neopentyl glycol | 2137 |
| Cyclohexanedimethanol | 893 |
| Terephthalic acid | 700 |
| Isophthalic acid | 2560 |
| Trimellitic anhydride | 280 |
| Dibutyltin oxide (catalyst) | 7 |
| Hexahydrophthalic anhydride | 1190 |

The neopentyl glycol, cyclohexanedimethanol, terephthalic acid, isophthalic acid, trimellitic anhydride and dibutyltin oxide were charged to a reaction vessel and heated to 200° C. under a nitrogen atmosphere and held at that temperature for one-half hour while constantly distilling water. The reaction mixture was then heated to 230° C. and held at that temperature until an acid value of about 5 was obtained. The reaction mixture was then cooled to 140° C. followed by the addition of the hexahydrophthalic anhydride. The reaction mixture was maintained at 140° C. until IR analysis indicated the disappearance of anhydride functionality. The reaction mixture was then cooled to room temperature to give a reaction product having a solids content of 100 percent (measured for 2 hours at 110° C.), an acid number of 66.2 and a hydroxyl value of 19.9.

EXAMPLE E

An acid functional polyurethane was prepared from the following mixture of ingredients:

| Ingredient | Parts by Weight (grams) |
| --- | --- |
| Methyl isobutyl ketone | 2699.7 |
| 1,6-hexanediol | 1940.7 |
| Dibutyltin dilaurate | 0.6 |
| DESMODUR W[1] | 3447 |
| Hexahydrophthalic anhydride | 911.8 |

[1]4,4"-methylene-bis(cyclohexyl isocyanate) obtained from Mobay Company.

The methyl isobutyl ketone, 1,6-hexanediol and dibutyltin dilaurate were charged to a reaction vessel and heated under a nitrogen atmoephere to 70° C. The DESMODUR W was added dropwise to the reaction mixture over a 6-hour period while maintaining the temperature of the reaction mixture at 70° C. After the DESMODUR W addition was completed, the reaction mixture was heated to 90° C. and maintained at this temperature until IR analysis indicated the disappearance of NCO functionality. The hexahydrophthalic anhydride was then added and the reaction mixture maintained at about 90° C. for about 2 hours. The reaction mixture was then heated under vacuum to remove solvent and then cooled to room temperature to give a solid reaction product which had a solids content (2 hours at 150° C.) of 73.2, an acid value of 39.7, a number average molecular weight of 2054 and a weight average molecular weight of 7015.

EXAMPLE F

Bis[N,N-di(beta-hydroxyethyl)]adipamide-glutaramide was prepared from the following mixture of ingredients:

| Ingredient | Parts by Weight (grams) |
| --- | --- |
| 90/10 weight ratio of dimethyl adipate/dimethyl glutarate | 1038.0 |
| Diethanolamine | 1512.0 |
| Methanolic sodium methoxide | 4.7 (20 ml) |

The ingredients were charged to a reaction vessel and heated to about 100° C. at which point the distillation of methanol began. Reaction was continued while distilling methanol (303 grams) until a temperature of 128° C. was reached. An additional 5 ml of methanolic sodium methoxide was added and heating continued until an additional 5 grams of methanol was obtained. A slight vacuum was applied to the reaction flask and an additional 28 grams of methanol was removed. The methanol distillate was added slowly back into the reaction mixture followed by the addition of 2000 ml of acetone. As the reaction mixture cooled, the hydroxyalkylamide precipitated. The precipitate was filtered, washed with acetone and air dried to yield a reaction product melting at 114°-118° C.

EXAMPLE G

In a manner similar to that of Example F, bis[N,N-di(-beta-hydroxyethyl)]sebacamide was prepared from the following mixture of ingredients:

| Ingredient | Parts by Weight (grams) |
| --- | --- |
| Diethyl sebacate | 129 |
| Diethanolamine | 126 |
| Methanolic sodium methoxide | 4.5 |

The reactants were heated under a nitrogen atmosphere to a temperature to initiate and to continue the distillation of ethanol. After 62 percent of the theoretical amount of ethanol was recovered, 2 grams of methanolic sodium methoxide were added and the reaction mixture heated until 66 percent of the theoretical amount of ethanol was recovered. All of the solvents were stripped under vacuum and the hydroxyalkylamide was crystallized with a methanol/acetone mixture. The reaction product melted at 95°-98° C.

EXAMPLE H

In a manner similar to Example F, bis[N-methyl-N(beta-hydroxyethyl)]adipamide was prepared from the following mixture of ingredients:

| Ingredient | Parts by Weight (grams) |
| --- | --- |
| Diethyl adipate | 161.6 |
| N—methylethanolamine | 150.0 |
| Methanolic sodium methoxide | 5.0 |

The reactants were heated under a nitrogen atmosphere to a temperature to initiate and to continue the distillation of ethanol. After 35 grams of ethanol was recovered, the excess solvents and N-methylethanolamine were removed under vacuum and the hydroxyalkylamide was crystallized with a methanol/acetone mixture. The reaction product melted at 74°-80° C.

The following examples (1-5) are of thermosetting pigmented powder coating compositions prepared with various carboxylic acid group-containing acrylic polymers, aliphatic dicarboxylic acids, polymeric polyanhydrides, carboxylic acid group-containing polyesters and polyurethanes. The compositions were cured with bis[N,N-di(beta-hydroxyethyl)]adipamide.

EXAMPLE 1

A pigmented powder coating composition was prepared from the following mixture of ingredients:

| Ingredient | Parts by Weight (grams) |
| --- | --- |
| Carboxylic acid group-containing acrylic polymer of Example B | 500.0 (45.0%) |
| Poly(dodecanedioic anhydride) of Example C | 75.0 (6.8%) |
| Carboxylic acid group-containing polyester of Example D | 360.0 (32.4%) |
| Beta-hydroxyalkylamide of Example F | 176.0 (15.8%) |
| Titanium dioxide | 200.0 |
| Carbon black | 4.6 |
| Ferrite yellow | 6.4 |
| Benzoin | 8.8 |
| MODAFLOW III[1] | 11.9 |
| IRGANOX 1076[2] | 22.2 |

[1]MODAFLOW III is poly(2-ethylhexyl-ethyl) acrylate on silica carrier available from Monsanto Co.
[2]IRGANOX 1076 is a polyphenol stabilizer that inhibits oxidation available from Ciba-Geigy.

The carboxylic acid group-containing acrylic polymer and the carboxylic acid group-containing polyester were melted together in an oven at 350° F. (177° C.).

The melt was then poured onto a bed of dry ice to solidify it and break it into chunks. The chunks were blended with the other ingredients in the formulation in a plaetary mixer and then melt blended in a Baker Perkins twin screw extruder at 130° C. The extrudate was chilled and flaked on a chill roll at 20° C., ground in a micromill and sieved through a 140 mesh screen. The resulting powder was then electrostatically sprayed onto grounded steel panels using an electrostatic spray gun. The coated panels were then baked at 177° C. to form hard glossy coatings. The properties of the resultant coating as well as the stability of the coating composition are reported in Table I below.

EXAMPLE 2

A pigmented powder coating composition was prepared from the following mixture of ingredients:

| Ingredient | Parts by Weight (grams) |
| --- | --- |
| Carboxylic acid group-containing acrylic polymer of Example A | 530.0 (55.8%) |
| Poly(dodecanedioic anhydride) of Example C | 100.0 (10.5%) |
| Carboxylic acid group-containing polyurethane of Example E | 170.0 (17.9%) |
| Beta-hydroxyalkylamide of Example F | 150.0 (15.8%) |
| Carbon black | 23.75 |
| TINUVIN 900[1] | 19.0 |
| TINUVIN 144[2] | 9.50 |
| IRGANOX 1076 | 14.25 |
| FC-430[3] | 3.80 |
| Benzoin | 7.60 |

[1]TINUVIN 900 is a substituted benzotriazole U.V. absorber available from Ciba-Geigy.
[2]TINUVIN 144 is a piperidinyl derivative U.V. absorber available from Ciba-Geigy.
[3]FC-430 is fluoropolymer flow control agents available from Minnesota Mining and Manufacturing Co.

The carboxylic acid group-containing acrylic polymer, polyanhydride, polyurethane and FC-430 were pre-extruded together in the Baker Perkins twin screw extruder at 110° C. The extrudate was chilled on a chill roll and broken into chunks which then blended with the other ingredients in the formulation in a planetary mixer and then melt blended in the Baker Perkins twin screw extruder at 130° C. The extrudate was chilled and particulated, sprayed onto steel panels and cured as generally described in Example 1. The properties of the resultant coating are reported in Table I below.

EXAMPLE 3

A pigmented powder coating composition was prepared from the following mixture of ingredients:

| Ingredient | Parts by Weight (grams) |
| --- | --- |
| Carboxylic acid group-containing acrylic polymer of Example A | 560.0 (55.8%) |
| Dodecanedioic acid | 100.0 (10.0%) |
| Carboxylic acid group-containing polyurethane of Example E | 176.0 (17.6%) |
| Beta-hydroxyalkylamide of Example F | 167.0 (16.6%) |
| Carbon black | 25.8 |
| TINUVIN 900 | 20.06 |
| TINUVIN 144 | 10.03 |
| IRGANOX 1076 | 15.05 |
| FC-430 | 1.50 |
| Benzoin | 8.02 |

All the ingredients mentioned above with the exception of the beta-hydroxyalkylamide and the carbon black were melted together in an oven at 350° F. (177° C.). The melt was poured onto a bed of dry ice to solidify it and break it into chunks which were then pre-extruded in the Baker Perkins twin screw extruder at 100° C. The extrudate was chilled on a chill roll and broken into chunks which were blended with the beta-hydroxyalkylamide and the carbon black in a planetary mixer followed by melt blending in the Baker Perkins twin screw extruder at 130° C. The extrudate was chilled, particulated, sprayed onto steel panels and cured as generally described in Example 1. The properties of the coating are reported in Table I below.

EXAMPLE 4

A pigmented powder coating composition was prepared from the following mixture of ingredients:

| Ingredients | Parts by Weight (grams) |
| --- | --- |
| Carboxylic acid group-containing acrylic polymer of Example A | 700.0 (70.0%) |
| Poly(dodecanedioic anhydride) | 120.0 (12.0%) |
| Beta-hydroxyalkylamide of Example F | 180.0 (18%) |
| Carbon black | 25.0 |
| TINUVIN 900 | 20.0 |
| TINUVIN 144 | 10.0 |
| IRGANOX 1076 | 15.0 |
| FC-430 | 2.0 |
| Benzoin | 8.0 |

All the ingredients with the exception of the carbon black and the beta-hydroxyalkylamide were melt blended at 100° C. in the Baker Perkins twin screw extruder. The extrudate was chilled and broken into chunks which were blended with the beta-hydroxyalkylamide and the carbon black in a planetary mixer followed by melt blending in the Baker Perkins twin screw extruder at 130° C. The extrudate was chilled, particulated, sprayed onto steel panels and cured as generally described in Example 1. The properties of the resultant coating are reported in Table I below.

EXAMPLE 5

A pigmented powder coating composition was prepared from the following mixture of ingredients:

| Ingredient | Parts by Weight (grams) |
| --- | --- |
| Carboxylic acid group-containing acrylic polymer of Example B | 3209.50 |
| Dodecanedioic acid | 874.50 |
| Carboxylic acid group-containing polyester of Example D | 378.60 |
| Liquid MODAFLOW[1] | 46.4 |

[1]Liquid MODAFLOW is poly(2-ethylhexyl-ethyl) acrylate available from Monsanto Co.

The ingredients were melted in an oven at 350° F. (177° C.). The melt was poured onto a bed of dry ice to solidify it and break it into chunks which were blended in a planetary mixer with the following ingredients:

| Ingredient | Parts by Weight (grams) |
| --- | --- |
| Solidified melt | 557 |
| Poly(dodecanedioic anhydride) | 36.0 |
| Beta-hydroxyalkylamide of Example F | 115.20 |
| Titanium dioxide | 145.0 |
| Carbon black | 1.50 |
| TINUVIN 900 | 14.50 |
| TINUVIN 144 | 7.30 |
| IRGANOX 1076 | 10.80 |
| Benzoin | 5.00 |

-continued

| Ingredient | Parts by Weight (grams) |
|---|---|
| AEROSIL 200[1] | 1.40 |

[1]Fumed silica available from Degussa Inc.

After blending in a planetary mixer, the blend was melt blended in the Baker Perkins twin screw extruder at 130° C. The extrudate was chilled, particulated, sprayed onto steel panels and cured as generally described in Example 1. The properties of the coating are reported in Table I below.

EXAMPLE 7

A clear powder coating composition was prepared from the following mixture of ingredients:

| Ingredient | Parts by Weight (grams) |
|---|---|
| Carboxylic acid group-containing acrylic polymer of Example A | 60.0 (60.4%) |
| Dodecanedioic acid | 15.0 (15.1%) |
| Beta-hydroxyalkylamide of Example F | 18.8 (18.9%) |
| Beta-hydroxyalkylamide of Example H | 5.5 (0.6%) |
| MODAFLOW[1] | 0.8 |

TABLE I

| Example No. | Stability[1] | Initial Gloss[2] 20° | Initial Gloss[2] 60° | Impact Resistance[3] in inch-pounds (coating thickness in mils) Direct | Impact Resistance[3] in inch-pounds (coating thickness in mils) Reverse | Mandrel Bend[4] | Pencil Hardness[5] | Solvent Resistance[6] | Salt Spray[7] 500 hours | Salt Spray[7] 1000 hours | Glosss After 500 Hours QUV Exposure[8] 20° | Glosss After 500 Hours QUV Exposure[8] 60° |
|---|---|---|---|---|---|---|---|---|---|---|---|---|
| 1 | excellent | 80 | 94 | 55 (1.6) | 40 (1.6) | 0"/0" | 3H | good | 1/16" | ¼" | 2 | 26 |
| 2 | excellent | 80 | 89 | 30 (2.0) | 5 (2.0) | 0"/0" | 3H | excellent | 0 | ¼" | 75 | 87 |
| 3 | excellent | 75 | 94 | 45 (2.0) | 5 (2.0) | 0"/0" | 3H | excellent | 1/16" | ¼" | 80 | 92 |
| 4 | excellent | 87 | 95 | 35 (3.0) | 35 (3.0) | 0"/0" | 3H | excellent | 0 | — | 80 | 92 |
| 5 | excellent | 63 | 84 | 160 (1.6) | 80 (1.6) | 0"/0" | 3H | good | ¼" | — | — | — |

[1]Stability determined by placing a sample of the powder coating in a 2 oz. glass jar and immersing in a water bath at 43° C. If there was no evidence of caking or clumping after 48 hours, a good rating was given. If there was no caking or clumping after 168 hours, an excellent rating was given.
[2]The 20° and 60° gloss were measured with gloss meters manufactured by the Gardner Instrument Company.
[3]The impact resistance was measured with a Gardner Impact Tester. The coated panels were subjected to increasing amounts of impact until the coating cracked. The panel was impacted on the coating side, i.e., direct impact, and also on the side of the coated panel opposite the coating, i.e., reverse impact. The results are reported in inch-pounds and the thickness of the coating in mils is shown in the parenthesis.
[4]The mandrel bend test is determined by bending coated panels (4" × 12") around a ¼ inch mandrel and measuring cracking/delamination in inches along the bend line.
[5]Pencil hardness is determined by taking pencils of increasing hardness (from F to 4H) and attempting to etch a scribe mark in the coating. The softest pencil which will etch the coating is reported as the pencil hardness for the film.
[6]Solvent resistance is determined by resistance to xylene. A cloth saturated with xylene is rubbed back and forth (double rub) using normal hand pressure over the cured coating. An excellent rating indicates the coating withstood at least 100 double rubs without dulling the coating. A good rating is for 50 double rubs. If less than 50 double rubs mars the coating, a failure is given.
[7]The salt spray corrosion resistance was measured by scribing the cured coated panels with a "X" and exposing the scribed panels to a salt spray fog at 100° F. (38° C.) as generally described in ASTM D-117 for 500 and 1000 hours. The panels were removed from the chamber, dried, the scribe mark taped with masking tape, the tape pulled off at a 45° angle and the creepage from the scribe mark measured. Creepage is the rusted darkened area of the panel where the coating has lifted from the panel surface.
[8]QUV exposure is determined by exposing the coated panels to alternating cycles of U.V. light and condensing humidity in a Q-U-V-Accelerated Weathering Tester manufactured by the Q-Panel Co. The U.V. light is generated with a UVB313 lamp (320–280 nanometers). The temperature of the U.V. light cycle is 70° C. The temperature of the condensing humidity cycle is 50° C.

The following examples (6–7) are thermosettting clear powder coating compositions prepared with different beta-hydroxyalkylamide curing agents.

EXAMPLE 6

A clear powder coating composition was prepared from the following mixture of ingredients:

| Ingredient | Parts by Weight (grams) |
|---|---|
| Carboxylic acid group-containing acrylic polymer of Example B | 75 (65.3%) |
| Dodecanedioic acid | 15.0 (13.0%) |
| Bis[N,N—(beta-hydroxyethyl)] sebacamide of Example G | 25.0 (21.7%) |
| IRGANOX 1076 | 1.5 |
| Benzoin | 0.7 |
| SURFYNOL 104[1] | 1.5 |

[1]Acetylenic alcohol from Air Products and Chemicals Co.

The carboxylic acid group-containing acrylic polymer and the dodecanedioic acid were melted together in an oven at 350° F. (177° C.). The melt was then poured onto a bed of dry ice to solidify it and break it into chunks which were blended with the other ingredients in a planetary mixer and then melt blended in a Baker Perkins twin screw extruder at 130° C. The extrudate was chilled, particulated, sprayed onto aluminum panels and cured as generally described in Example 1. The resultant coating had good solvent resistance, excellent appearance, impact resistance and gloss retention after 500 hours QUV exposure.

| Benzoin | 0.8 |
|---|---|
| IRGANOX 1076 | 2.0 |

[1]MODAFLOW was poly(2-ethylhexyl-ethyl) acrylate available from Monsanto Co.

The ingredients were blended together and formulated into a powder, sprayed onto aluminum panels and cured as generally described in Example 6. The resultant coating had excellent solvent resistance, appearance and impact resistance (160 inch-pounds direct at coating thickness of 2.0 mils).

What is claimed is:

1. A thermosetting powder coating composition comprising a co-reactable particulate mixture of:
   (A) 35–85 percent by weight based on weight of resin solids of an acid group-containing acrylic polymer having a Tg in the range of 35°–100° C.;
   (B) from 1–25 percent by weight based on weight of resin solids of a second carboxy group-containing material selected from the class consisting of aliphatic dicarboxylic acid containing from 4 to 20 carbon atoms per molecule and a polymeric polyanhydride including mixture thereof; and
   (C) a beta-hydroxyalkylamide curing agent; the equivalent ratio of beta-hydroxyalkylamide to carboxy functionality being within the range of 0.6 to 1.6:1.

2. The composition of claim 1 in which the acrylic polymer has a number average molecular weight within the range of 1500 to 15,000.

3. The composition of claim 1 in which the acrylic polymer is formed from polymerizing an alpha, beta-ethylenically unsaturated carboxylic acid selected from the class consisting of acrylic acid and methacrylic acid, a $C_1$ to $C_{20}$ alkyl ester of acrylic or methacrylic acid including mixtures of such esters and a polymerizable vinyl aromatic compound.

4. The composition of claim 3 which contains a $C_1$ to $C_2$ alkyl ester of acrylic or methacrylic acid and a $C_4$ to $C_{20}$ alkyl ester of acrylic or methacrylic acid.

5. The composition of claim 1 in which the aliphatic dicarboxylic acid containing from 4 to 20 carbon atoms is dodecanedioic acid.

6. The composition of claim 1 in which the polymeric polyanhydride is of the structure:

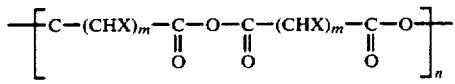

where X equals hydrogen, methyl, ethyl and m equals 4 to 10 and n is a number such that the polymeric polyanhydride has a number average molecular weight of 400 to 2500.

7. The composition of claim 6 in which the polymeric polyanhydrie is selected from the class consisting of poly(adipic anhydride), poly(azelaic anhydride) and poly(dodecanedioic anhydride), including poly(mixed anhydrides).

8. The composition of claim 7 in which the polymeric polyanhydride is poly(dodecanedioic anhydride).

9. The composition of claim 1 in which the hydroxyalkylamide is of the structure:

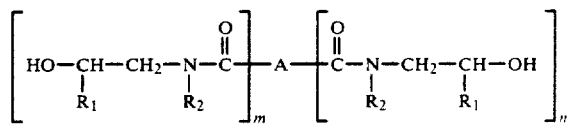

wherein $R_1$ is H or $C_1$-$C_5$ alkyl; $R_2$ is H, $C_1$-$C_5$ alkyl or

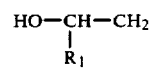

wherein $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms; m equals 1 to 2 and n equals 0 to 2 and m+n is at least 2.

10. The composition of claim 1 in which (A) is present in the composition in amounts of about 40 to 75 percent by weight based on total weight of resin solids.

11. The composition of claim 1 in which (B) is present in the composition in amounts of about 5 to 20 percent by weight based on weight of resin solids.

* * * * *

UNITED STATES PATENT AND TRADEMARK OFFICE
CERTIFICATE OF CORRECTION

PATENT NO.  : 4,727,111
DATED       : February 23, 1988
INVENTOR(S) : Paul H. Pettit, Jr. et al It is certified that error appears in the above-identified patent and that said Letters Patent is hereby corrected as shown below:

Column 14, line 58 (line 11 of Claim 1), "mixture" should be --mixtures--.

Column 15, line 15 (line 3 of Claim 6), the correct formula should read:

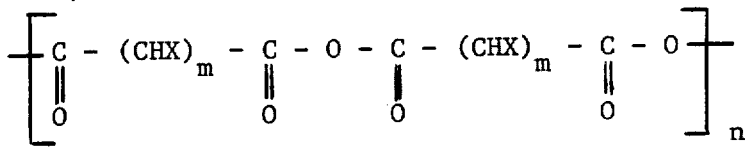

Column 15, line 24 (line 2 of Claim 7), "polyanhydrie" should be --polyanhydride--.

Signed and Sealed this

Fifth Day of July, 1988

*Attest:*

DONALD J. QUIGG

*Attesting Officer*     *Commissioner of Patents and Trademarks*